Oct. 10, 1933.  W. J. KENNY  1,929,433
CONTAINER
Filed June 25, 1930
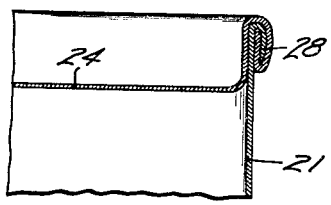
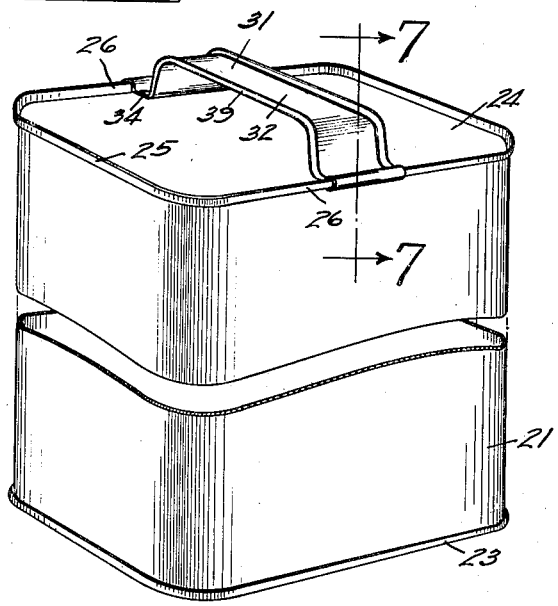
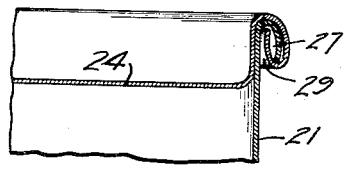
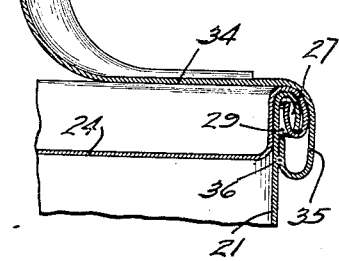
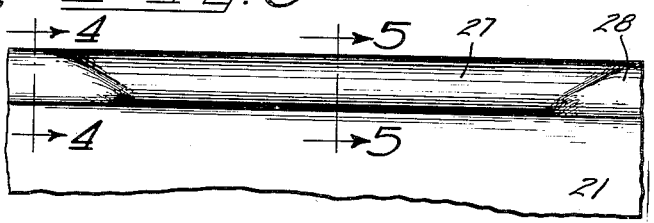
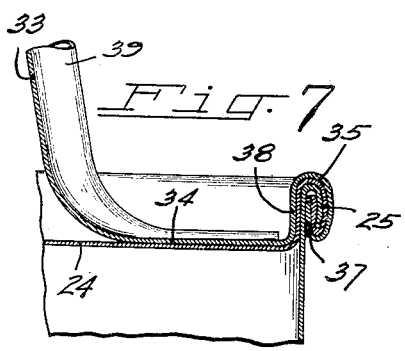
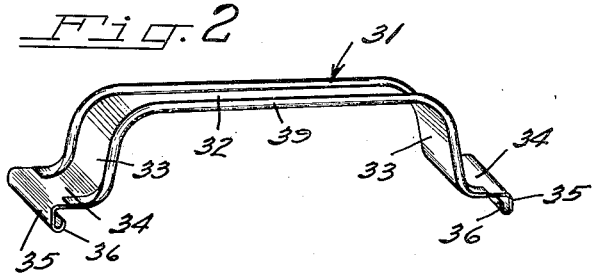
INVENTOR
William J. Kenny
BY
John C. Carpenter
ATTORNEY Patented Oct. 10, 1933

1,929,433

UNITED STATES PATENT OFFICE 1,929,433

CONTAINER

William J. Kenny, Cicero, Ill., assignor to American Can Company, New York, N. Y., a corporation of New Jersey Application June 25, 1930. Serial No. 463,711

3 Claims. (Cl. 220—94)

The present invention relates to a container and has particular reference to such a container embodying an improved type of handle.

The principal object of the present invention is the provision of an improved type of container on which a carrying handle is secured by incorporation of its ends in the seam formed by the junction of the container and its end or cover.

An important object of the invention is the provision of an improved type of handle which may be easily applied to the container after the ends of the container have been applied and which is easily secured in place.

An important object of the invention is the provision of an improved type of container having parallel sides and a handle member secured at opposed points thereof in the seam between the container and the top closure of the container. The handle engages beneath the projecting seam to provide an improved support for the container when carried by the handle.

Numerous other objects of the invention will be apparent as it is better understood from the following description, which, taken in connection with the accompanying drawing, discloses a preferred embodiment thereof.

Referring to the drawing:—

Figure 1 is a perspective view of a container and handle embodying the present invention.

Fig. 2 is a perspective view of the improved handle used therein as it appears prior to attachment to the container.

Fig. 3 is an enlarged fragmentary side elevation of a part of the container showing its seam preparatory to receiving its handle.

Fig. 4 is a sectional detail taken substantially along the line 4—4 in Fig. 3.

Fig. 5 is a view similar to Fig. 4 taken substantially along the line 5—5 in Fig. 3.

Fig. 6 is a sectional view of that portion of the container illustrated in Fig. 5, showing in section one end of the handle and the seam prior to incorporation of the handle in the seam of the container.

Fig. 7 is an enlarged sectional detail taken substantially along the line 7—7 in Fig. 1.

Any suitable form of container may be utilized in the present invention, the drawing illustrating as a preferred form a rectangular container body 21 provided with a bottom secured thereto in a seam 23. The container is also supplied with an upper end 24 secured to the body 21 by a seam 25. The rectangular form of body 21 and end 24 provide parallel straight seam parts in and to which the handle is engaged.

As illustrated in the drawing, the seam 25 is the usual double seam and opposed parts of the parallel portions 26 of the seam are left partially open or loose as shown at 27 (Fig. 3). This open portion 27 may be the result of the first operation in double seaming, the remaining part of the seam 25 being tightly and completely closed as shown at 28 (Figs. 3 and 4).

The open seam construction provides a recess 29 (Fig. 5) adjacent the wall of the body 21 at each side and in this recess a portion of the handle member is slipped in its incorporation in the seam, as will now be described.

An improved type of handle 31 (Figs. 1 and 2) comprises a hand grip 32 connecting with inclined walls 33 extending into horizontal sections 34 connecting to vertical walls 35, each wall terminating in a hooked end 36.

After the end 24 has been seamed to the body 21 and the open seam parts 27 have been provided in the parallel walls 26 thereof, the handle member which is then of the form illustrated in Figs. 2 and 6, is placed onto the container with the horizontal sections 34 thereof resting upon the top of the seam 25. The vertical walls 35 engage the outer edges of the seams and extend downwardly therefrom, the hooked ends 36 being arranged beneath the open sections of the double seam and directly below the recesses 29, as illustrated in Fig. 6, and are so arranged as not to enter into the sealing region of the joint between the body and cover.

The handle member need only be lifted to insert its hooked ends 36 fully within the recesses 29 of the open seam sections 27, after which the seam parts 27 are closed and the handle ends are bent to tightly embrace the seam. In this final assembled position (Fig. 7) the upper part of each of the walls 35 is bent over into close engagement with the upper edge of the seam 25 and downwardly to provide a vertical wall 38 closely engaging the end 24 adjacent the double seam. The horizontal sections 34 after this bending action are brought against the upper surface of the end 24 and the open seam portions are thereupon closed, thus tightly clamping the handle 31 in permanent assembled position.

This incorporation of the ends of the handle into the double seam of the container provides an improved type of vessel in which may be carried contents of heavy weight, the hooked ends 36 of the handle providing supports for this container weight. The handle may be provided with rolled or curled edges 39 which not only further reinforce the handle but provide for a smoother hand-hold.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container, comprising a body, an end member secured to said body in a double seam, and a metal handle extending continuously from side to side of the container and secured to said container by having its ends incorporated in and embracing said double seam, and being arranged outside of the sealing joint.

2. A container, comprising a rectangular body having straight parallel walls, an end member secured to said body in a double seam, and a flat metal handle extending continuously from side to side of the container and having hooked ends inserted in said seam at opposite positions in said parallel walls and permanently held therein by said seam, and being arranged outside of the sealing joint.

3. A container, comprising a body, an end member secured to the body in a double seam, and a handle formed of a single piece of sheet metal extending from side to side of the body, the extreme ends of the handle being arranged on the outside of the body and clamped thereto by the seamed-on cover, the ends of the handle extending over the double seam and downward to the central part of the said end member.

WILLIAM J. KENNY.